US012515807B2

(12) United States Patent
Tomes

(10) Patent No.: US 12,515,807 B2
(45) Date of Patent: Jan. 6, 2026

(54) BOLTED CONNECTION BETWEEN MOUNTING BRACKET AND AIRCRAFT ENGINE CASE(S)

(71) Applicant: Pratt & Whitney Canada Corp., Longueuil (CA)

(72) Inventor: Nathan Tomes, Hamilton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 30 days.

(21) Appl. No.: 18/416,984

(22) Filed: Jan. 19, 2024

(65) Prior Publication Data

US 2025/0236404 A1   Jul. 24, 2025

(51) Int. Cl.
| | |
|---|---|
| *B64D 29/06* | (2006.01) |
| *B64C 1/16* | (2006.01) |
| *F01D 25/24* | (2006.01) |

(52) U.S. Cl.
CPC ........... *B64D 29/06* (2013.01); *F01D 25/243* (2013.01); *B64C 1/16* (2013.01); *F05D 2220/323* (2013.01); *F05D 2260/31* (2013.01)

(58) Field of Classification Search
CPC ....... B64D 29/06; B64D 27/404; F01D 25/24; F01D 25/243; B64C 1/16; F05D 2220/323; F05D 2260/30; F05D 2260/31; F05D 2260/311
See application file for complete search history.

(56) References Cited

U.S. PATENT DOCUMENTS

| | | | |
|---|---|---|---|
| 2,819,732 A | * | 1/1958 | Paetz ..................... F01D 17/162 |
| | | | 415/161 |
| 6,212,974 B1 | | 4/2001 | Van Duyn |
| 6,829,883 B2 | | 12/2004 | Sathianathan |
| 9,133,731 B2 | | 9/2015 | Reed |
| 9,410,441 B2 | * | 8/2016 | Macfarlane ........... F01D 25/246 |
| 10,247,038 B2 | * | 4/2019 | Kappes ................. F01D 21/045 |
| 10,815,825 B2 | | 10/2020 | Denis |
| 11,773,748 B2 | | 10/2023 | Farabow, III |

(Continued)

FOREIGN PATENT DOCUMENTS

| | | |
|---|---|---|
| CN | 220010068 U | 11/2023 |
| EP | 0940337 B1 | 11/2003 |
| EP | 3312390 B1 | 9/2020 |

OTHER PUBLICATIONS

EP Search Report for EP Patent Application No. 25152646.3 dated May 26, 2025.

*Primary Examiner* — Elton K Wong
(74) *Attorney, Agent, or Firm* — Getz Balich LLC

(57) ABSTRACT

An assembly for an aircraft includes a first engine case, a bracket and fastener assemblies. The first engine case includes a first sidewall and a first flange projecting radially out from the first sidewall. The bracket is abutted axially against the first flange. The fastener assemblies attach the bracket to the first flange. The fastener assemblies include a first fastener assembly with a first bolt, a first nut and a retainer. The first bolt includes a first bolt head and a first bolt shank that projects axially out from the first bolt head and axially through the first flange and the bracket. The first nut is threaded onto the first bolt shank with the first flange and the bracket is axially between the first bolt head and the first nut. The retainer is attached to the first bolt shank with the first nut axially between the retainer and the bracket.

15 Claims, 6 Drawing Sheets

(56) References Cited

U.S. PATENT DOCUMENTS

| | | |
|---|---|---|
| 2013/0202430 A1* | 8/2013 | Gaudry .................... F02C 7/32 |
| | | 415/214.1 |
| 2013/0255276 A1 | 10/2013 | Jorgensen |
| 2015/0075177 A1* | 3/2015 | Natal .................... B64D 27/40 |
| | | 60/797 |
| 2019/0055991 A1 | 2/2019 | Wuestenberg |
| 2020/0284155 A1 | 9/2020 | Ranganath |
| 2021/0016887 A1 | 1/2021 | Stelldinger |
| 2021/0023927 A1 | 1/2021 | Appleby |
| 2023/0044678 A1* | 2/2023 | Blagojevic ........... B64D 27/404 |

* cited by examiner

BOLTED CONNECTION BETWEEN MOUNTING BRACKET AND AIRCRAFT ENGINE CASE(S)

TECHNICAL FIELD

This disclosure relates generally to an aircraft engine and, more particularly, to attaching a mounting bracket to one or more engine cases.

BACKGROUND INFORMATION

Various techniques are known in the art for attaching a mounting bracket to one or more engine cases. While these known attachment techniques have various benefits, there is still room in the art for improvement.

SUMMARY

According to an aspect of the present disclosure, an assembly is provided for an aircraft. This aircraft assembly includes a first engine case, a bracket and a plurality of fastener assemblies. The first engine case extends axially along and circumferentially around an axis. The first engine case includes a tubular first sidewall and an annular first flange projecting radially out from the tubular first sidewall. The bracket is abutted axially against the annular first flange. The bracket extends circumferentially about the axis between opposing circumferential sides of the bracket. The fastener assemblies attach the bracket to the annular first flange. The fastener assemblies include a first fastener assembly. The first fastener assembly includes a first bolt, a first nut and a retainer. The first bolt includes a first bolt head and a first bolt shank that projects axially out from the first bolt head and axially through the annular first flange and the bracket. The first nut is threaded onto the first bolt shank with the annular first flange and the bracket is axially between the first bolt head and the first nut. The retainer is attached to the first bolt shank with the first nut axially between the retainer and the bracket.

According to another aspect of the present disclosure, another assembly is provided for an aircraft. This aircraft assembly includes a first engine case, an engine mounting bracket and a plurality of first fastener assemblies. The first engine case extends axially along and circumferentially around an axis. The first engine case includes a first flange. The engine mounting bracket is arranged with the first flange. The first fastener assemblies fasten the engine mounting bracket to the first flange. The first fastener assemblies are arranged along the engine mounting bracket. Each of the first fastener assemblies include a first bolt, a first nut and a retainer. The first bolt includes a first bolt head and a first bolt shank. The first nut is threaded onto the first bolt shank with the first flange, and the engine mounting bracket is clamped between the first bolt head and the first nut. The retainer is attached to the first bolt shank with the first nut disposed between the retainer and the engine mounting bracket.

According to still another aspect of the present disclosure, another assembly is provided for an aircraft. This aircraft assembly includes a first engine case, a second engine case, a mounting bracket and a plurality of fastener assemblies. The first engine case extends axially along and circumferentially about an axis. The first engine case includes a first flange. The second engine case extends axially along and circumferentially about the axis. The second engine case includes a second flange. The first flange is between and engaged with the second flange and the mounting bracket. The fastener assemblies are arranged along the mounting bracket. A first of the fastener assemblies include a first bolt, a first nut and a retainer. The first bolt projects through the second flange, the first flange and the mounting bracket. The first nut is threaded onto the first bolt and the retainer is configured to retain the first nut on the first bolt. A second of the fastener assemblies includes a second bolt and a second nut threaded on the second bolt. The second bolt projects through the first flange and the mounting bracket with a head of the second bolt captured between the first flange and the second flange.

The assembly may also include a second engine case extending axially along and circumferentially around the axis. The second engine case may include a second flange. The first fastener assembly may also fasten the engine mounting bracket to the second flange. The second flange, the first flange and the engine mounting bracket may be clamped axially between the first bolt head and the first nut.

The first bolt shank may project axially out from the first bolt head and axially through the annular first flange and the bracket to a distal end of the first bolt. An aperture may extend through the first bolt shank at the distal end of the first bolt. The retainer may be configured as or otherwise include a cotter pin projecting through the aperture.

When the annular first flange and the bracket are clamped and preloaded axially between the first nut and the first bolt head, the first nut may be axially spaced from the retainer by an axial distance.

The first fastener assembly may be one of a plurality of first fastener assemblies included in the fastener assemblies. The fastener assemblies may also include a second fastener assembly configured without a retainer.

The tubular first sidewall may extend axially along the axis to a first end of the first engine case. The annular first flange may be connected to the tubular first sidewall at the first end of the first engine case.

The bracket may axially overlap and may be disposed radially outboard of the tubular first sidewall.

The assembly may also include a second engine case extending axially along and circumferentially around the axis. The second engine case may include a tubular second sidewall and an annular second flange projecting radially out from the tubular second sidewall. The first bolt shank may project axially out from the first bolt head and axially through the annular second flange, the annular first flange and the bracket to a distal end of the first bolt. The annular second flange, the annular first flange and the bracket may be clamped axially between the first bolt head and the first nut.

The fastener assemblies may also include a second fastener assembly. The second fastener assembly may include a second bolt and a second nut. The second bolt may include a second bolt head and a second bolt shank projecting axially out from the second bolt head and axially through the annular first flange and the bracket. The second bolt head may be captured axially between the annular first flange and the annular second flange. The second nut may be threaded onto the second bolt shank with the annular first flange and the bracket axially between the second bolt head and the second nut.

The second fastener assembly may be configured without a retainer.

The first fastener assembly may be one of a plurality of first fastener assemblies included in the fastener assemblies.

The second fastener assembly may be arranged circumferentially between a circumferentially neighboring pair of the first fastener assemblies.

The first fastener assembly may be one of a plurality of first fastener assemblies included in the fastener assemblies. The second fastener assembly may be one of a plurality of second fastener assemblies included in the fastener assemblies. Two or more of the second fastener assemblies may be arranged circumferentially between a circumferentially neighboring pair of the first fastener assemblies.

The second fastener assembly may be one of a plurality of second fastener assemblies included in the fastener assemblies. The first fastener assembly may be arranged circumferentially between a circumferentially neighboring pair of the second fastener assembly.

The assembly may also include a bladed rotor rotatable about the axis and a stationary structure configured to house the bladed rotor. The stationary structure may include the first engine case.

The bladed rotor may be configured as or otherwise include a fan rotor.

The assembly may also include an aircraft airframe component and an aircraft engine comprising the first engine case. The bracket may be configured to attach the aircraft engine to the aircraft airframe component.

The bracket may include a plurality of parallel plates. The first bolt shank may project axially through the annular first flange and the parallel plates between the first bolt head and the first nut.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
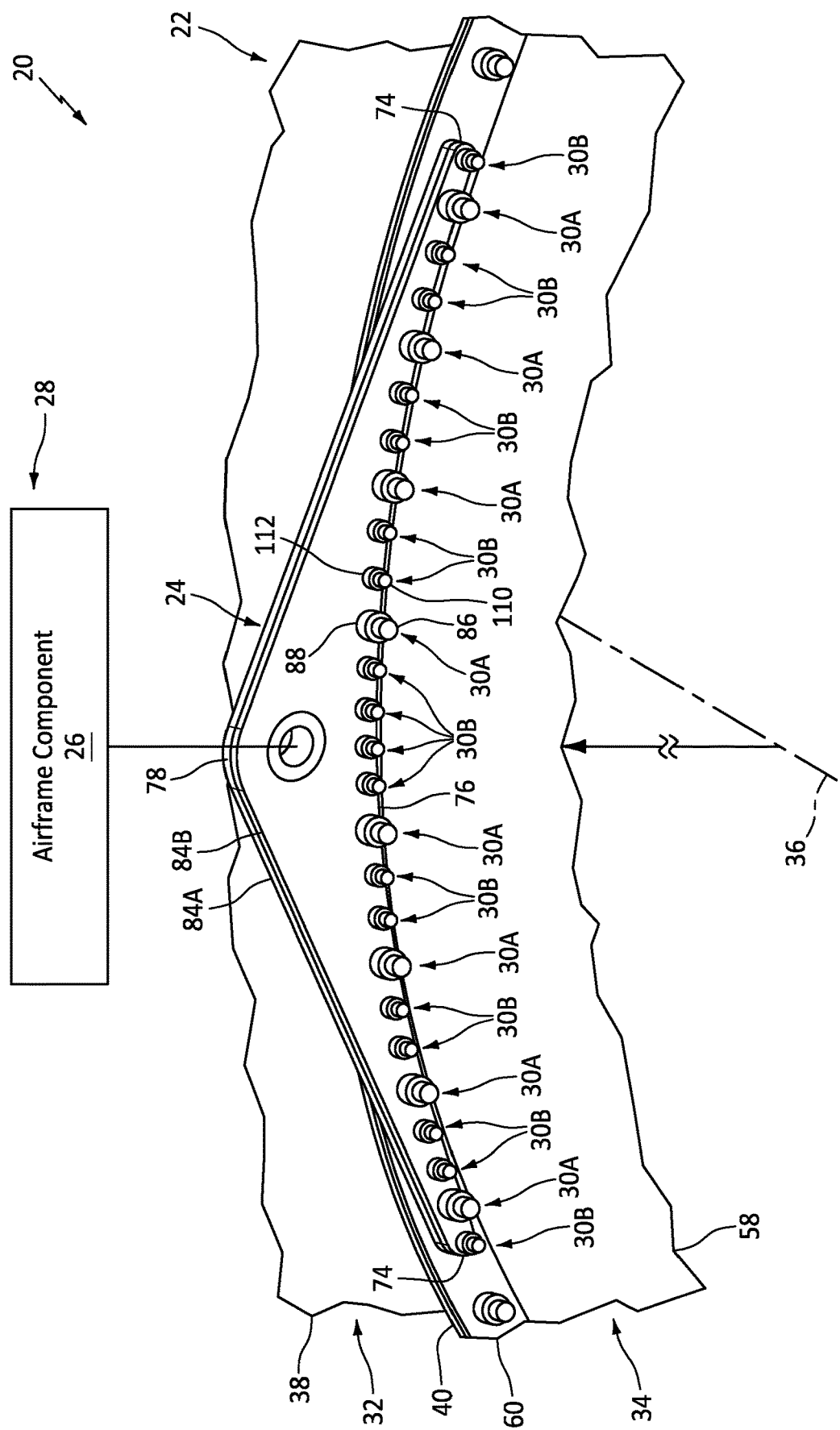
FIG. 1 is an illustration of a portion of an aircraft assembly with an airframe component schematically shown.

FIG. 1 illustrates a portion of an assembly 20 for an aircraft. The aircraft may be an airplane, a drone (e.g., an unmanned aerial vehicle (UAV)) or any other manned or unmanned aerial vehicle or system. The aircraft assembly 20 includes a stationary structure 22 of an aircraft engine, and an engine mounting bracket 24 for mounting and structurally tying the stationary structure 22 to a component 26 of an aircraft airframe 28. The aircraft assembly 20 also includes a plurality of fastener assemblies 30A and 30B (generally referred to as "30") mechanically fastening the mounting bracket 24 to the stationary structure 22.

Figure 2:
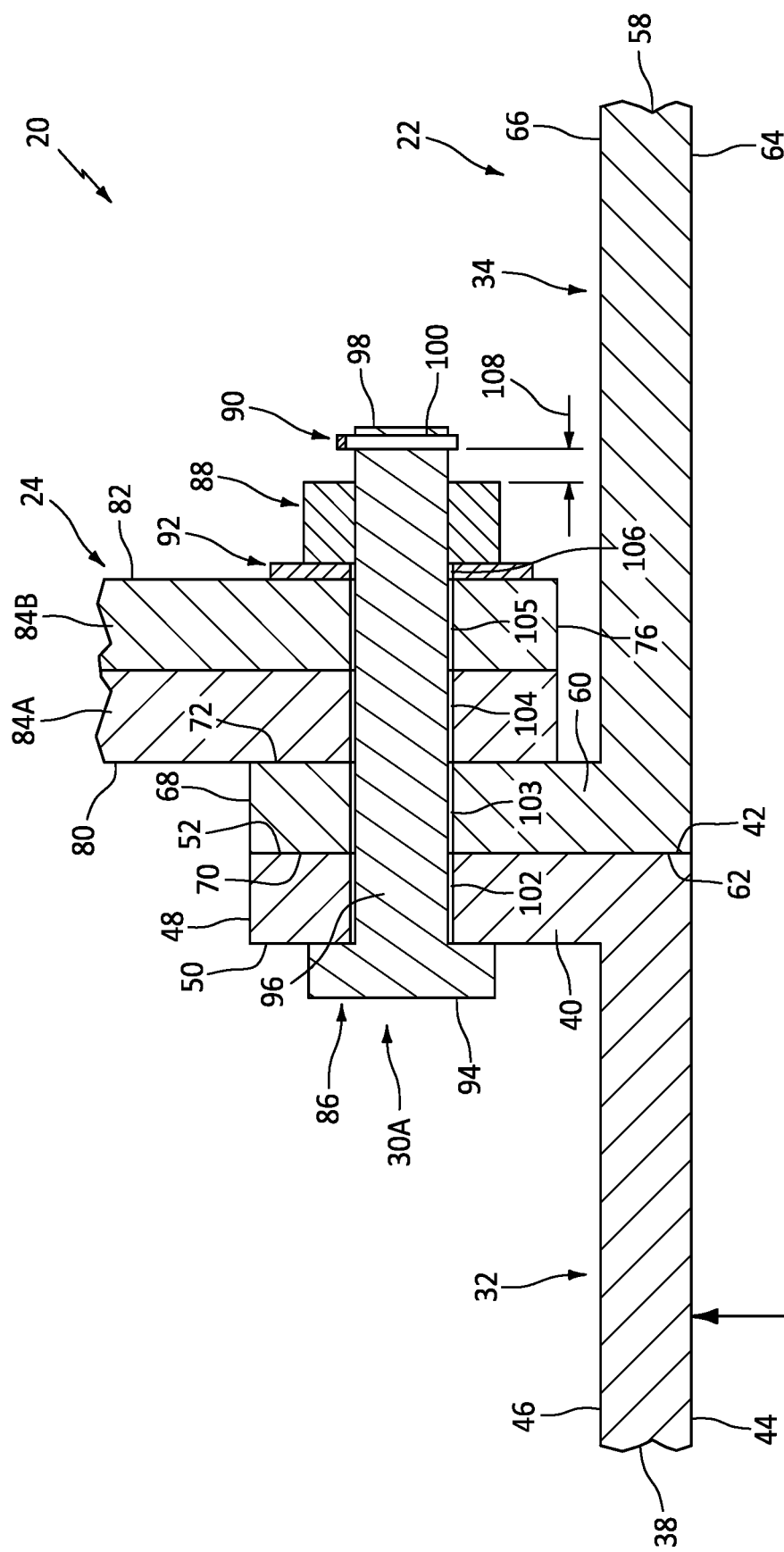
FIG. 2 is a side sectional illustration of a portion of the aircraft assembly at a first fastener assembly.
Figure 3:
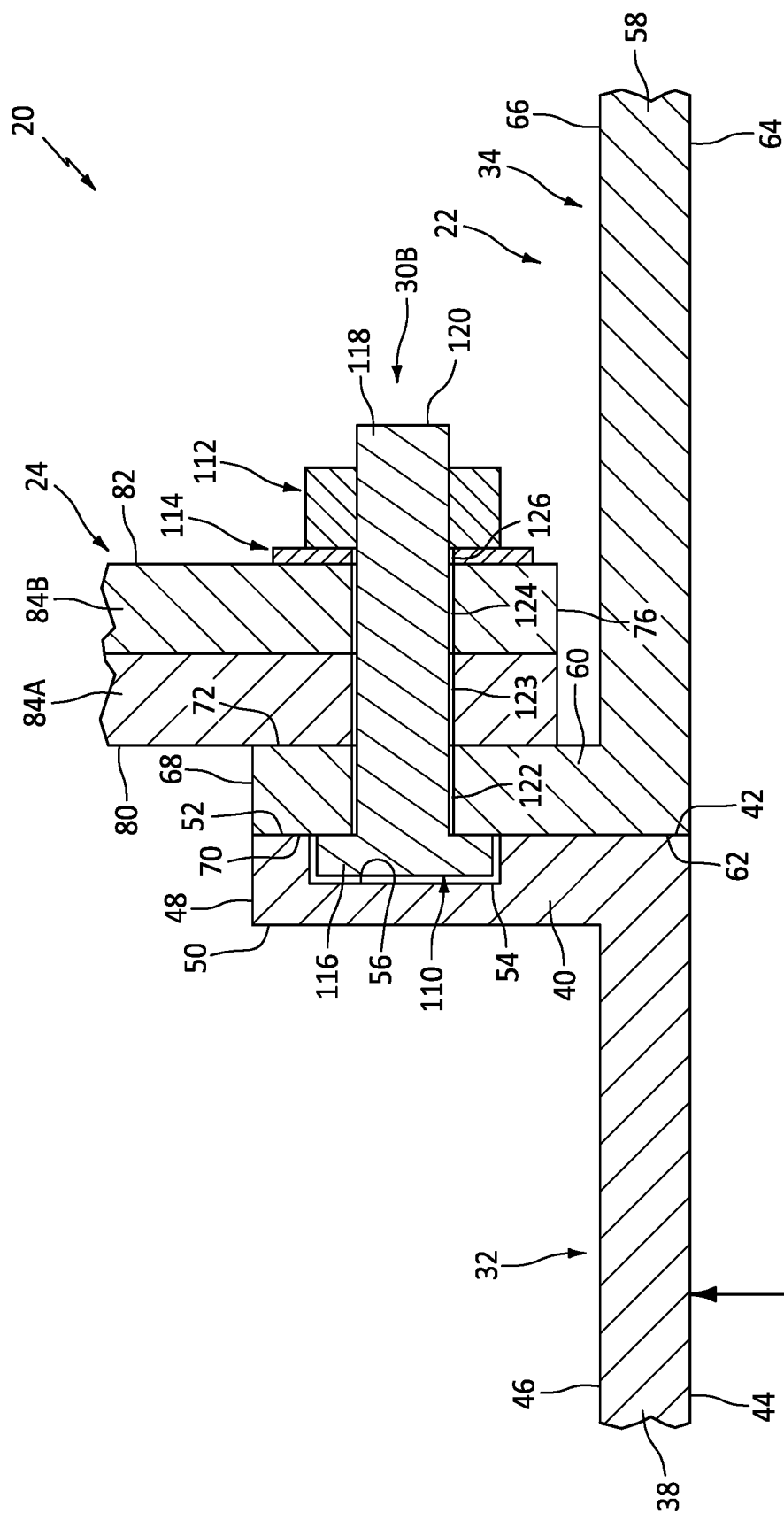
FIG. 3 is a side sectional illustration of a portion of the aircraft assembly at a second fastener assembly.

Referring to FIGS. 2 and 3, the stationary structure 22 may be configured as a housing for one or more components and/or sections of the aircraft engine. The stationary structure 22 of FIGS. 2 and 3 includes an upstream, forward engine case 32 and a downstream, aft engine case 34.

The forward engine case 32 may be configured as a section of a duct wall (e.g., a bypass duct wall) that forms a radial outer peripheral boundary of a flowpath (e.g., a bypass flowpath) of the aircraft engine. Alternatively, the forward engine case 32 may be configured as a propulsor case (e.g., a fan case, a containment case, etc.) that houses a propulsor rotor (e.g., a fan rotor) of the aircraft engine. The present disclosure, however, is not limited to the foregoing exemplary forward engine case configurations. The forward engine case 32 of FIGS. 2 and 3 extends axially along and circumferentially about an axis 36. Briefly, this axis 36 may be a centerline axis of the aircraft engine and/or one or more of its members 32 and/or 34. The axis 36 may also or alternatively be a rotational axis of one or more rotors and/or rotating assemblies of the aircraft engine. The forward engine case 32 of FIGS. 2 and 3 includes a forward case sidewall 38 and a forward case flange 40.

The forward case sidewall 38 extends axially along the axis 36 to a downstream, aft end 42 of the forward engine case 32 and its forward case sidewall 38. The forward case sidewall 38 extends radially from a radial inner side 44 of the forward engine case 32 and its forward case sidewall 38 to a radial outer side 46 of the forward case sidewall 38. The forward case sidewall 38 extends circumferentially about (e.g., completely around) the axis 36 providing the forward case sidewall 38 with, for example, a full-hoop (e.g., tubular) geometry.

The forward case flange 40 is connected to (e.g., formed integral with or attached to) the forward case sidewall 38 at (e.g., on, adjacent or proximate) the forward engine case aft end 42. This forward case flange 40 projects radially out from the forward case sidewall 38 and its forward case sidewall outer side 46 to a radial outer distal end 48 of the forward case flange 40. The forward case flange 40 extends axially between and to an upstream, forward side 50 of the forward case flange 40 and a downstream, aft side 52 of the forward case flange 40, which forward case flange aft side 52 of FIGS. 2 and 3 partially forms the forward engine case aft end 42. The forward case flange 40 extends circumferentially about (e.g., completely around) the axis 36 providing the forward case flange 40 with, for example, a full-hoop (e.g., annular) geometry.

Figure 4:
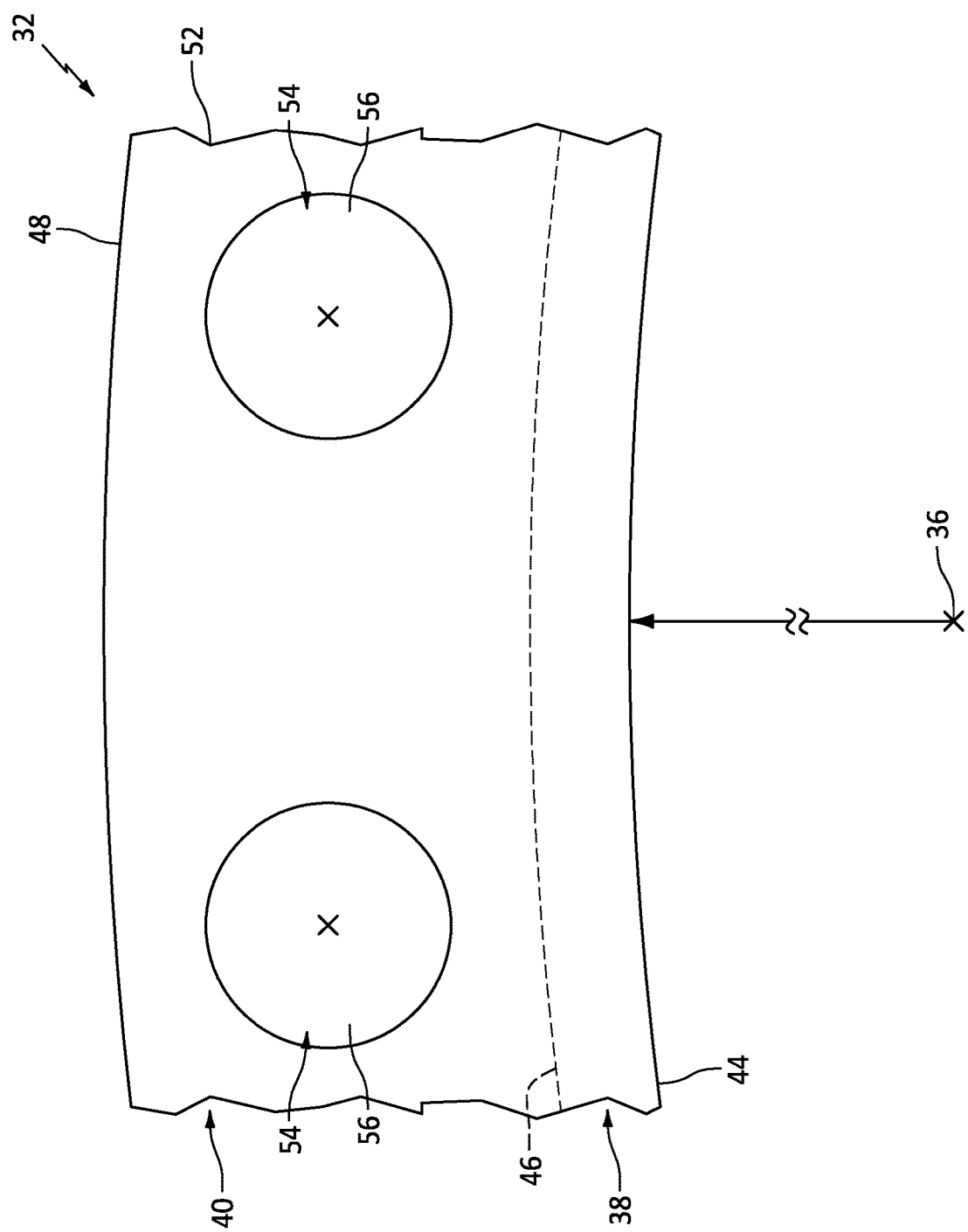
FIG. 4 is an end view illustration of a portion of an engine case.

Referring to FIG. 4, the forward case flange 40 includes one or more pockets 54. These pockets 54 are arranged circumferentially about the axis 36 in an array; e.g., an arcuate array. Each of the pockets 54 extends radially and circumferentially within the forward case flange 40. Referring to FIG. 3, each pocket 54 projects partially axially into the forward case flange 40 from the forward case flange aft side 52 to an interior distal end 56 of the respective pocket 54. Referring again to FIG. 4, each pocket 54 may have a circular cross-sectional geometry when viewed, for example, in a reference plane parallel to the forward case flange aft side 52. The present disclosure, however, is not limited to such an exemplary pocket geometry.

Referring to FIGS. 2 and 3, the aft engine case 34 may be configured as another section of the duct wall. The present disclosure, however, is not limited to the foregoing exemplary aft engine case configuration. The aft engine case 34 of FIGS. 2 and 3 extends axially along and circumferentially about the axis 36. The aft engine case 34 of FIGS. 2 and 3 includes an aft case sidewall 58 and an aft case flange 60.

The aft case sidewall 58 extends axially along the axis 36 to an upstream, forward end 62 of the aft engine case 34 and its aft case sidewall 58. The aft case sidewall 58 extends radially from a radial inner side 64 of the aft engine case 34 and its aft case sidewall 58 to a radial outer side 66 of the aft case sidewall 58. The aft case sidewall 58 extends circumferentially about (e.g., completely around) the axis 36 providing the aft case sidewall 58 with, for example, a full-hoop (e.g., tubular) geometry.

The aft case flange 60 is connected to (e.g., formed integral with or attached to) the aft case sidewall 58 at the aft engine case forward end 62. This aft case flange 60 projects radially out from the aft case sidewall 58 and its aft case sidewall outer side 66 to a radial outer distal end 68 of the aft case flange 60. The aft case flange 60 extends axially between and to an upstream, forward side 70 of the aft case flange 60 and a downstream, aft side 72 of the aft case flange 60, which aft case flange forward side 70 of FIGS. 2 and 3 partially forms the aft engine case forward end 62. The aft case flange 60 extends circumferentially about (e.g., completely around) the axis 36 providing the aft case flange 60 with, for example, a full-hoop (e.g., annular) geometry.

The aft engine case 34 is arranged axially next to the forward engine case 32. The aft case flange 60 at its aft case flange forward side 70, for example, axially engages (e.g., contacts, abuts against, etc.) the forward case flange 40 and its forward case flange aft side 52. At this axial interface between the aft engine case 34 and the forward engine case 32, the aft engine case inner side 64 may be radially aligned with the forward engine case inner side 44.

Referring to FIG. 1, the mounting bracket 24 extends circumferentially about (e.g., partially around) the axis 36 between and to opposing circumferential ends 74 of the mounting bracket 24. Between these opposing circumferential ends 74, the mounting bracket 24 may extend between five degrees (10°) and thirty degrees (60°) about the axis 36. The present disclosure, however, is not limited to such an exemplary arrangement. The mounting bracket 24 extends radially from a radial inner side 76 of the mounting bracket 24 to a radial outer side 78 of the mounting bracket 24. Referring to FIGS. 2 and 3, the mounting bracket 24 extends axially along the axis 36 between and to opposing axial sides 80 and 82 of the mounting bracket 24.

The mounting bracket 24 of FIGS. 1-3 is formed from a pair of parallel mounting bracket plates 84A and 84B (generally referred to as "84"). Each of these bracket plates 84 forms a respective axial section (e.g., half) of the mounting bracket 24. The forward bracket plate 84A of FIGS. 2 and 3 forms the mounting bracket forward side 80. The aft bracket plate 84B forms the mounting bracket aft side 82. The bracket plates 84 are arranged axially side-by-side and axially engage one another at an axial interface between the bracket plates 84. The mounting bracket 24 of the present disclosure, however, is not limited to such an exemplary mounting bracket configuration. The mounting bracket 24, for example, may alternatively be configured as a single, unitary body; e.g., the bracket plates 84 may be formed together as a single monolithic bracket plate.

The mounting bracket 24 is arranged radially outboard of the stationary structure 22. The mounting bracket 24 of FIGS. 2 and 3, for example, is disposed radially outboard of and next to the aft engine case 34 and its aft case sidewall 58. The mounting bracket 24 is also disposed axially next to the aft engine case 34. The mounting bracket 24 of FIGS. 2 and 3 and its forward bracket plate 84A, for example, axially engage the aft case flange 60. In particular, the mounting bracket forward side 80 axially engages the aft case flange aft side 72. With this arrangement, the aft case flange 60 is axially between and abuts against or otherwise engages the forward case flange 40 and the mounting bracket 24 and its forward bracket plate 84A.

Referring to FIG. 1, the first fastener assemblies 30A are arranged circumferentially about the axis 36 in an array; e.g., an arcuate array. Similarly, the second fastener assemblies 30B are arranged circumferentially about the axis 36 in an array; e.g., an arcuate array. The second fastener assemblies 30B are further circumferentially interspersed with the first fastener assemblies 30A. For example, each of the first fastener assemblies 30A of FIG. 1 is arranged circumferentially between (e.g., and next to) a respective circumferentially neighboring (e.g., adjacent) pair of the second fastener assemblies 30B. Here, a single one of the first fastener assemblies 30A is located circumferentially between the respective circumferentially neighboring pair of the second fastener assemblies 30B. Similarly, at least some of the second fastener assemblies 30B of FIG. 1 are each arranged circumferentially between a respective circumferentially neighboring (e.g., adjacent) pair of the first fastener assemblies 30A. Here, multiple of the second fastener assemblies 30B are located circumferentially between the respective circumferentially neighboring pair of the first fastener assemblies 30A. The present disclosure, however, is not limited to such an exemplary fastener assembly arrangement. For example, a single one of the second fastener assemblies 30B may alternatively be located circumferentially between the respective circumferentially neighboring pair of the first fastener assemblies 30A. In another example, multiple of the first fastener assemblies 30A may be located circumferentially between the respective circumferentially neighboring pair of the second fastener assemblies 30B.

Referring to FIG. 2, each first fastener assembly 30A includes a first bolt 86, a first nut 88 and a retainer 90. Each first fastener assembly 30A of FIG. 2 also includes a first washer 92.

The first bolt 86 includes a first bolt head 94 and a first bolt shank 96. The first bolt shank 96 is connected to (e.g., formed integral with) the first bolt head 94. This first bolt shank 96 projects longitudinally along a longitudinal centerline of the first bolt 86 (e.g., axially along the axis 36) out from the first bolt head 94 to a longitudinal distal end 98 of the first bolt 86 and its first bolt shank 96. The first bolt shank 96 includes a retainer aperture 100 (e.g., a through hole) disposed at or near the first bolt distal end 98. The retainer aperture 100 of FIG. 2, for example, is (e.g., slightly) longitudinally spaced from the first bolt distal end 98 by a longitudinal distance. This retainer aperture 100 extends laterally (e.g., diametrically relative to the longitudinal centerline) through the first bolt shank 96 between opposing lateral sides of the first bolt shank 96.

Each first fastener assembly 30A is configured to attach the mounting bracket 24 to the stationary structure 22. The first bolt head 94 of FIG. 2, for example, is axially abutted against or otherwise engaged with the forward case flange 40 and its forward case flange forward side 50. The first bolt shank 96 projects axially out from the first bolt head 94, axially across the forward case flange 40, the aft case flange 60 and the mounting bracket 24 and its bracket plates 84, to its first bolt distal end 98. More particularly, the first bolt shank 96 projects sequentially axially through respective fastener apertures 102-105 (e.g., bolt holes) in the forward case flange 40, the aft case flange 60 and the bracket plates 84A and 84B. The first washer 92 is mounted on the first bolt shank 96, where the first bolt shank 96 projects axially through a fastener aperture 106 in the first washer 92. The first nut 88 is threaded onto the first bolt 86 and its first bolt shank 96 at its first bolt distal end 98. The first nut 88 may be tightened (e.g., torqued) to axially clamp and preload the elements 40, 60, 84A, 84B and 92 sequentially between the first bolt head 94 and the first nut 88. Here, a (e.g., slight) gap between the first bolt shank 96 and an outer periphery of each fastener apertures 102-105 may be selected to tune dynamics following, for example, a loss of the preload as described below.

Figure 5:
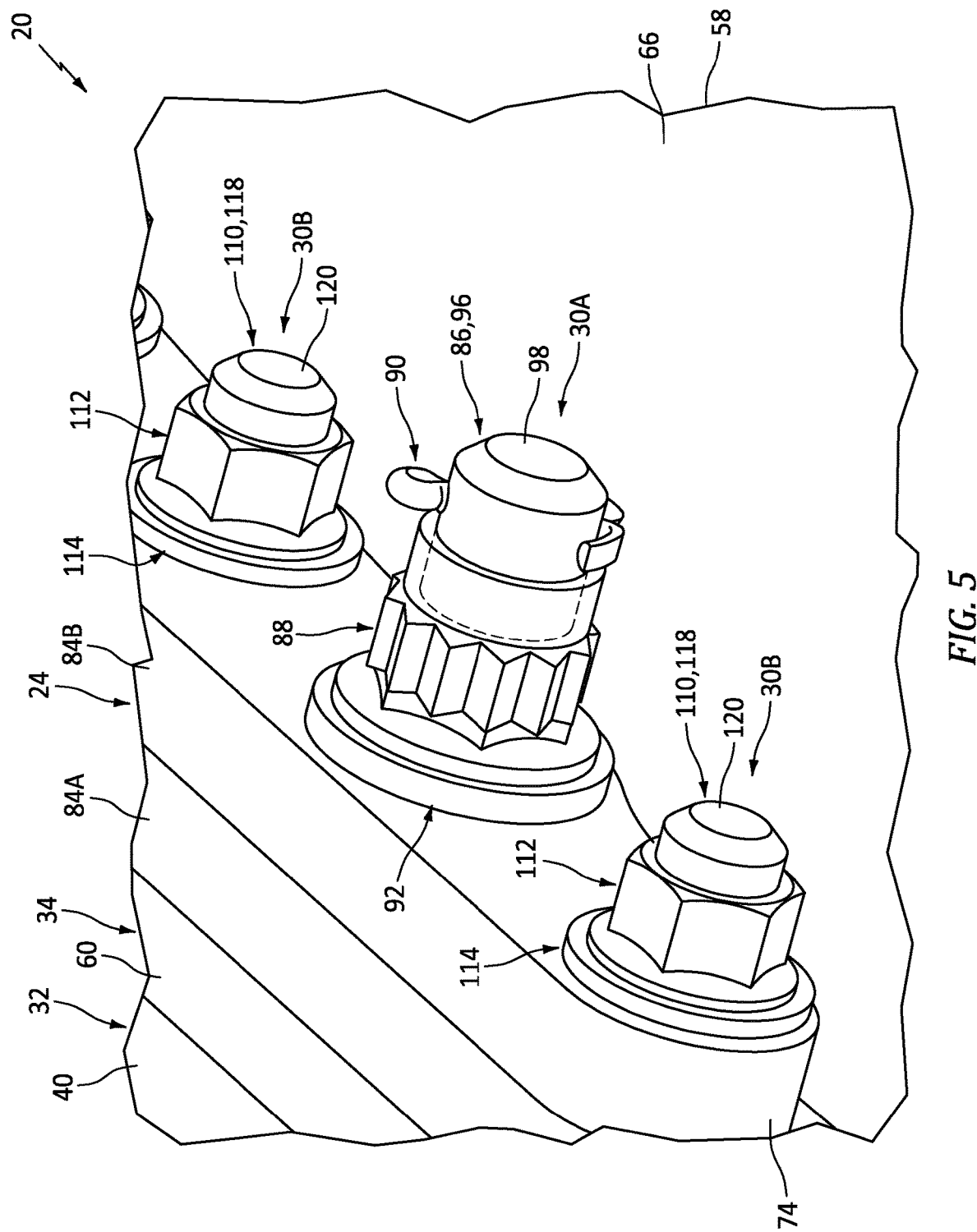
FIG. 5 is a perspective illustration of a portion of the aircraft assembly.

The retainer 90 is attached to the first bolt shank 96. For example, where the retainer 90 is a cotter pin (or another retaining pin such as a hitch pin), the retainer 90 is inserted into the retainer aperture 100 and splayed apart to secure the retainer 90 to the first bolt 86; e.g., see FIG. 5. The retainer 90 may be axially spaced from the first nut 88 by an axial distance 108. With this arrangement, the first nut 88 is captured axially between the retainer 90 and the mounting bracket 24.

Referring to FIG. 3, each second fastener assembly 30B includes a second bolt 110 and a second nut 112. Each second fastener assembly 30B of FIG. 3 also includes a second washer 114.

The second bolt 110 includes a second bolt head 116 and a second bolt shank 118. The second bolt shank 118 is connected to (e.g., formed integral with) the second bolt head 116. This second bolt shank 118 projects longitudinally along a longitudinal centerline of the second bolt 110 (e.g., axially along the axis 36) out from the second bolt head 116 to a longitudinal distal end 120 of the second bolt 110 and its second bolt shank 118.

Each second fastener assembly 30B is configured to attach the mounting bracket 24 to the stationary structure 22. The second bolt head 116 of FIG. 2, for example, is axially abutted against or otherwise engaged with the aft case flange 60 and its aft case flange forward side 70. Here, the second bolt head 116 is disposed within a respective one of the pockets 54 and is axially captured between the forward case flange 40 and the aft case flange 60. The second bolt shank 118 projects axially out from the second bolt head 116, axially across the aft case flange 60 and the mounting bracket 24 and its bracket plates 84A and 84B, to its second bolt distal end 120. More particularly, the second bolt shank 118 projects sequentially axially through respective fastener apertures 122-124 (e.g., bolt holes) in the aft case flange 60 and the bracket plates 84A and 84B. The second washer 114 is mounted on the second bolt shank 118, where the second bolt shank 118 projects axially through a fastener aperture 126 in the second washer 114. The second nut 112 is threaded onto the second bolt 110 and its second bolt shank 118 at its second bolt distal end 120. The second nut 112 may be tightened (e.g., torqued) to axially clamp and preload the elements 60, 84A, 84B and 114 sequentially between the second bolt head 116 and the second nut 112.

During normal aircraft engine operation, the fastener assemblies 30 of FIG. 1 axially clamp and preload the elements 40, 60, 84A and 84B together as described above. Radial loads (e.g., shear loads) may thereby be transferred between the stationary structure 22 and the mounting bracket 24 without (e.g., any or very little) slip between the elements 22 and 24; e.g., 60 and 84A. Under certain conditions, however, it may be useful to reduce the load transfer and/or joint stiffness between the stationary structure 22 and the mounting bracket 24. For example, during a rotor blade out event such as a fan blade out (FBO) event, the stationary structure 22 and its engine cases 32 and 34 may be subject to relatively large vibrational loads. The stationary structure 22 and its engine cases 32 and 34 may also be subject to relatively large vibrational loads following the rotor blade out event where the now unbalanced rotor windmills during aircraft flight. When such large vibrational loads are sustained for an extended period of time, some aircraft components may be subject to over fatigue.

To reduce negative impacts associated with transmitting relatively large vibrational loads from the stationary structure 22 into the mounting bracket 24 and, thus, the airframe component 26 for an extended period of time, the fastener assemblies 30 are configured to loosen following sustained exposure to large vibrational loads. The large vibrational loads, for example, may cause each first nut 88 of FIG. 2 to backoff and unthread along the first bolt shank 96. Each first nut 88, however, is retained on the first bolt shank 96 by the respective retainer 90. Each first fastener assembly 30A may thereby continue to (e.g., loosely) attach the mounting bracket 24 to the stationary structure 22. The large vibrational loads may also cause each second nut 112 of FIG. 3 to back off and unthread along the second bolt shank 118. Here, the second nut 112 is not retained onto the second bolt shank 118 by a retainer. It is therefore possible for the second nut 112 to eventually fall off of the second bolt shank 118. However, since the second bolt head 116 is captured between the forward case flange 40 and the aft case flange 60, the respective second fastener assembly 30B may continue to (e.g., loosely) attach the mounting bracket 24 to the stationary structure 22. The fastener assemblies 30 may thereby maintain a connection between the aircraft engine and the aircraft airframe 28. Moreover, by facilitating a relatively loose connection between the stationary structure 22 and the mounting bracket 24, a change in effective mount stiffness is provided by an introduction of no-force-travel where none may have existed before. This drop in stiffness may reduce forces generated in the system at a given displacement. The drop in effective stiffness may also reduce the engine installation modes associated with the mount. Tuning the shank to hole gap may also facilitate moving a highly excited mode out of a high loading frequency ranges.

The mounting bracket 24 of FIG. 1 is shown as axially overlapping the aft case sidewall 58 and abutting axially against the aft case flange 60. The present disclosure, however, is not limited to such an exemplary arrangement. The mounting bracket 24, for example, may alternatively axially overlap the forward case sidewall 38 and abut against the forward case flange 40. Moreover, it is contemplated the mounting bracket 24 may alternatively abut against or otherwise axially engage another element of an engine case; e.g., a flange, etc. spaced from an inter-case connection. For example, the mounting bracket 24 may be attached to a circumferential (e.g., a full annular or arcuate) and/or a tangential plate. In another example, the mounting bracket 24 may be attached to an axially extending element.

In some embodiments, referring to FIG. 1, both the first fastener assemblies 30A and the second fastener assemblies 30B are included to attach the mounting bracket 24 to the stationary structure 22. In other embodiments, however, it is contemplated the second fastener assemblies 30B may be omitted such that only the first fastener assemblies 30A attach the mounting bracket 24 to the stationary structure 22. Each of the second fastener assemblies 30B shown in FIG. 1, for example, may be replaced by another first fastener assembly 30A.

Figure 6:
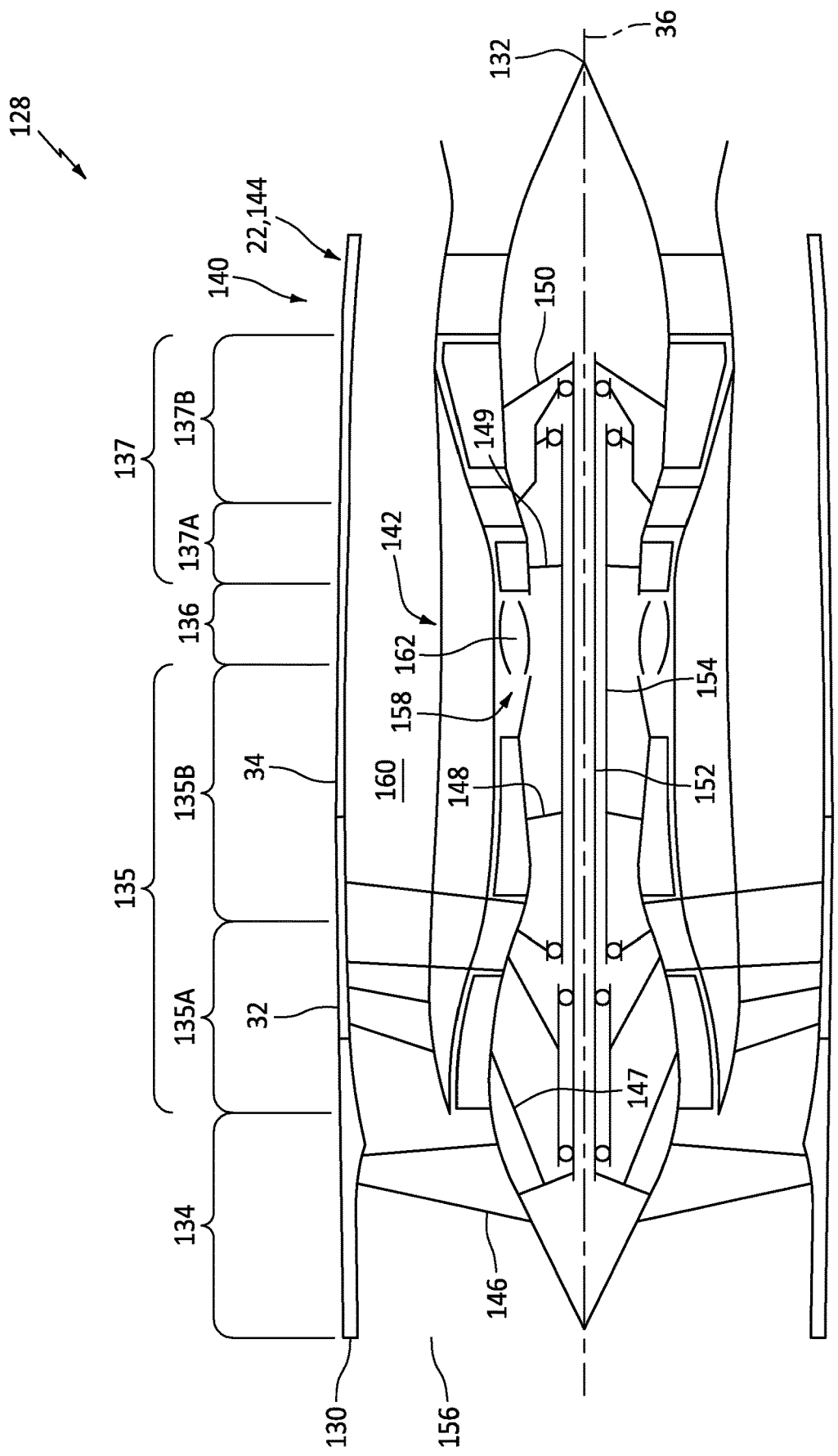
FIG. 6 is a side sectional schematic illustration of a gas turbine engine.

FIG. 6 illustrates an exemplary embodiment of the aircraft engine as a turbofan gas turbine engine 128 which includes the stationary structure 22. This gas turbine engine 128 extends along the axis 36 from an upstream, forward end 130 of the gas turbine engine 128 to a downstream, aft end 132 of the gas turbine engine 128. The gas turbine engine 128 of FIG. 6 includes a fan section 134, a compressor section 135, a combustor section 136 and a turbine section 137. The compressor section 135 includes a low pressure compressor (LPC) section 135A and a high pressure compressor (HPC) section 135B. The turbine section 137 includes a high pressure turbine (HPT) section 137A and a low pressure turbine (LPT) section 137B.

The engine sections 134-137B are arranged sequentially along the axis 36 within an engine housing 140. This engine housing 140 includes an inner case 142 (e.g., a core case) and an outer case 144 (e.g., a fan case). The inner case 142 may house one or more of the engine sections 135A-137B; e.g., a core of the gas turbine engine 128. The outer case 144 may house at least the fan section 134. Here, the outer case 144 is configured as or otherwise includes the stationary structure 22.

Each of the engine sections 134, 135A, 135B, 137A and 137B includes a respective bladed rotor 146-150. Each of these engine rotors 146-150 includes a plurality of rotor blades arranged circumferentially around and connected to one or more respective rotor disks. The rotor blades, for example, may be formed integral with or mechanically fastened, welded, brazed and/or otherwise attached to the respective rotor disk(s).

The fan rotor 146 and the LPC rotor 147 are connected to and driven by the LPT rotor 150 through a low speed shaft 152. The HPC rotor 148 is connected to and driven by the HPT rotor 149 through a high speed shaft 154. The shafts 152 and 154 are rotatably supported by a plurality of bearings; e.g., rolling element and/or thrust bearings. Each of these bearings is connected to the engine housing 140 by at least one support structure such as, for example, an annular support frame.

During operation, air enters the gas turbine engine 128 through an airflow inlet 156 into the gas turbine engine 128. This air is directed through the fan section 134 and into a core flowpath 158 and a bypass flowpath 160. The core flowpath 158 extends sequentially through the engine sections 135A-137B; e.g., the engine core. The air within the core flowpath 158 may be referred to as "core air". The bypass flowpath 160 extends through a bypass duct that bypasses the engine core. The air within the bypass flowpath 160 may be referred to as "bypass air".

The core air is compressed by the LPC rotor 147 and the HPC rotor 148 and directed into a combustion chamber 162 of a combustor in the combustor section 136. Fuel is injected into the combustion chamber 162 and mixed with the compressed core air to provide a fuel-air mixture. This fuel-air mixture is ignited and combustion products thereof flow through and sequentially cause the HPT rotor 149 and the LPT rotor 150 to rotate. The rotation of the HPT rotor 149 and the LPT rotor 150 respectively drive rotation of the HPC rotor 148 and the LPC rotor 147 and, thus, compression of the air received from an airflow inlet into the core flowpath 158. The rotation of the LPT rotor 150 also drives rotation of the fan rotor 146, which propels the bypass air through and out of the bypass flowpath 160. The propulsion of the bypass air may account for a majority of thrust generated by the gas turbine engine 128, e.g., more than seventy-five percent (75%) of engine thrust. The gas turbine engine 128 of the present disclosure, however, is not limited to the foregoing exemplary thrust ratio.

The aircraft assembly 20 may be configured for various aircraft engines other than the one described above. The aircraft assembly 20, for example, may be configured for a geared gas turbine engine where a geartrain connects one or more shafts to one or more rotors in a fan section, a compressor section and/or any other engine section. Alternatively, the aircraft assembly 20 may be configured for a gas turbine engine configured without a geartrain. The aircraft assembly 20 may be configured for a gas turbine engine with a single spool, with two spools (e.g., see FIG. 6), or with more than two spools. The gas turbine engine may be configured as a turbofan engine, a turbojet engine, a turboprop engine, a turboshaft engine, a propfan engine, a pusher fan engine or any other type of gas turbine engine. The gas turbine engine may alternatively be configured as an auxiliary power unit (APU) or an industrial gas turbine engine. The present disclosure therefore is not limited to any particular types or configurations of gas turbine engines or, more generally, aircraft engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft, comprising:
a first engine case extending axially along and circumferentially around an axis, the first engine case including a tubular first sidewall and an annular first flange projecting radially out from the tubular first sidewall;
a second engine case extending axially along and circumferentially around the axis, the second engine case including a tubular second sidewall and an annular second flange projecting radially out from the tubular second sidewall;
a bracket abutted axially against the annular first flange, the bracket extending circumferentially about the axis between opposing circumferential sides of the bracket; and
a plurality of fastener assemblies attaching the bracket to the annular first flange, the plurality of fastener assemblies comprising a first fastener assembly and a second fastener assembly;
the first fastener assembly including a first bolt, a first nut and a retainer, the first bolt including a first bolt head and a first bolt shank that projects axially out from the first bolt head and axially through the annular second flange, the annular first flange and the bracket to a distal end of the first bolt, the first nut threaded onto the first bolt shank with the annular second flange, the annular first flange and the bracket clamped axially between the first bolt head and the first nut, and the retainer attached to the first bolt shank with the first nut axially between the retainer and the bracket; and
the second fastener assembly including a second bolt and a second nut, the second bolt including a second bolt head and a second bolt shank projecting axially out from the second bolt head and axially through the annular first flange and the bracket, the second bolt head captured axially between the annular first flange and the annular second flange, and the second nut threaded onto the second bolt shank with the annular first flange and the bracket axially between the second bolt head and the second nut.

2. The assembly of claim 1, wherein
an aperture extends through the first bolt shank at the distal end of the first bolt; and
the retainer comprises a cotter pin projecting through the aperture.

3. The assembly of claim 1, wherein, when the annular first flange and the bracket are clamped and preloaded axially between the first nut and the first bolt head, the first nut is axially spaced from the retainer by an axial distance.

4. The assembly of claim 1, wherein the first fastener assembly is one of a plurality of first fastener assemblies included in the plurality of fastener assemblies.

5. The assembly of claim 1, wherein
the tubular first sidewall extends axially along the axis to a first end of the first engine case; and
the annular first flange is connected to the tubular first sidewall at the first end of the first engine case.

6. The assembly of claim 1, wherein the bracket axially overlaps and is disposed radially outboard of the tubular first sidewall.

7. The assembly of claim 1, wherein the second fastener assembly is configured without a retainer.

8. The assembly of claim 1, wherein
the first fastener assembly is one of a plurality of first fastener assemblies included in the plurality of fastener assemblies; and
the second fastener assembly is arranged circumferentially between a circumferentially neighboring pair of the plurality of first fastener assemblies.

9. The assembly of claim 1, wherein
the first fastener assembly is one of a plurality of first fastener assemblies included in the plurality of fastener assemblies; and
the second fastener assembly is one of a plurality of second fastener assemblies included in the plurality of fastener assemblies, and two or more of the plurality of second fastener assemblies are arranged circumferentially between a circumferentially neighboring pair of the plurality of first fastener assemblies.

10. The assembly of claim 1, wherein
the second fastener assembly is one of a plurality of second fastener assemblies included in the plurality of fastener assemblies; and
the first fastener assembly is arranged circumferentially between a circumferentially neighboring pair of the plurality of second fastener assemblies.

11. The assembly of claim 1, further comprising:
a bladed rotor rotatable about the axis; and
a stationary structure configured to house the bladed rotor, the stationary structure comprising the first engine case.

12. The assembly of claim 11, wherein the bladed rotor comprises a fan rotor.

13. The assembly of claim 1, further comprising:
an aircraft airframe component; and
an aircraft engine comprising the first engine case;
the bracket configured to attach the aircraft engine to the aircraft airframe component.

14. The assembly of claim 1, wherein
the bracket comprises a plurality of parallel plates; and
the first bolt shank projects axially through the annular first flange and the plurality of parallel plates between the first bolt head and the first nut.

15. An assembly for an aircraft, comprising:
a first engine case extending axially along and circumferentially about an axis, the first engine case comprising a first flange;
a second engine case extending axially along and circumferentially about the axis, the second engine case comprising a second flange;
a mounting bracket, wherein the first flange is between and engaged with the second flange and the mounting bracket; and
a plurality of fastener assemblies arranged along the mounting bracket;
a first of the plurality of fastener assemblies including a first bolt, a first nut and a retainer, the first bolt projecting through the second flange, the first flange and the mounting bracket, the first nut threaded onto the first bolt and the retainer configured to retain the first nut on the first bolt; and
a second of the plurality of fastener assemblies including a second bolt and a second nut threaded on the second bolt, the second bolt projecting through the first flange and the mounting bracket with a head of the second bolt captured between the first flange and the second flange.

* * * * *